United States Patent [19]

Newman

[11] 4,301,605
[45] Nov. 24, 1981

[54] EXCAVATION AND TRANSPLANTING OF PLANTS WITH A BALL OF SOIL

[76] Inventor: Christopher J. Newman, Arbour House, Hemp La., Wigginton, Tring Hertfordshire, England, HP23 6HE

[21] Appl. No.: 166,977
[22] PCT Filed: Feb. 1, 1979
[86] PCT No.: PCT/GB79/00020
  § 371 Date: Oct. 1, 1979
  § 102(e) Date: Sep. 24, 1979
[87] PCT Pub. No.: WO79/00575
  PCT Pub. Date: Aug. 23, 1979

[30] Foreign Application Priority Data

Feb. 1, 1978 [GB] United Kingdom ............... 4033/78

[51] Int. Cl.³ .................... A01G 23/06; A01G 23/04
[52] U.S. Cl. ............................ 37/2 R; 47/76
[58] Field of Search ..................... 47/76; 37/2 R

[56] References Cited

U.S. PATENT DOCUMENTS

| 594,668 | 11/1897 | Wilkens | 37/2 R |
| 2,769,278 | 11/1956 | Wassell et al. | 37/2 R |
| 2,988,393 | 6/1961 | Logan | 47/76 |
| 2,990,630 | 7/1961 | Crawford | 37/2 R |
| 3,017,707 | 1/1962 | Sigler et al. | 37/2 R |
| 3,017,719 | 1/1962 | Sigler et al. | 37/2 R X |
| 3,191,982 | 6/1965 | Goalard | 37/2 R X |
| 3,201,089 | 8/1965 | Napoletano | 37/2 R X |
| 3,427,734 | 2/1969 | Eberhart | 37/2 R |
| 3,471,192 | 10/1969 | Childs et al. | 37/2 R X |
| 3,618,234 | 11/1971 | Bates | 37/2 R |
| 4,031,637 | 6/1977 | Stocker | 37/2 R |

FOREIGN PATENT DOCUMENTS 2250468 6/1975 France ................... 47/76

*Primary Examiner*—Steven A. Bratlie
*Attorney, Agent, or Firm*—Shapiro and Shapiro

[57] ABSTRACT

Apparatus for excavating and transplanting of plants and trees comprising interlockable curved blades (16) detachable from the driving apparatus (32 & 33) such that several soil-balls and several sizes of soil-ball can be excavated consecutively by the apparatus driving each blade (16) successively by the transfer of momentum from a rapidly reciprocating device (32 & 33) producing little resultant reactive force. The soil-balls so dug are secured in the temporary reusable containers formed by sets of interlocked blades, and may be extracted from the plantation by normal lifting and transporting means to the place of transplanting, without the encumbrance of the excavating apparatus accompanying each plant. The apparatus incorporates means for guidance (1, 2 15 & 21) of the detachable blades during driving and means (17) for guided rotation and positioning of the apparatus about the vertical axis of the tree.

6 Claims, 9 Drawing Figures

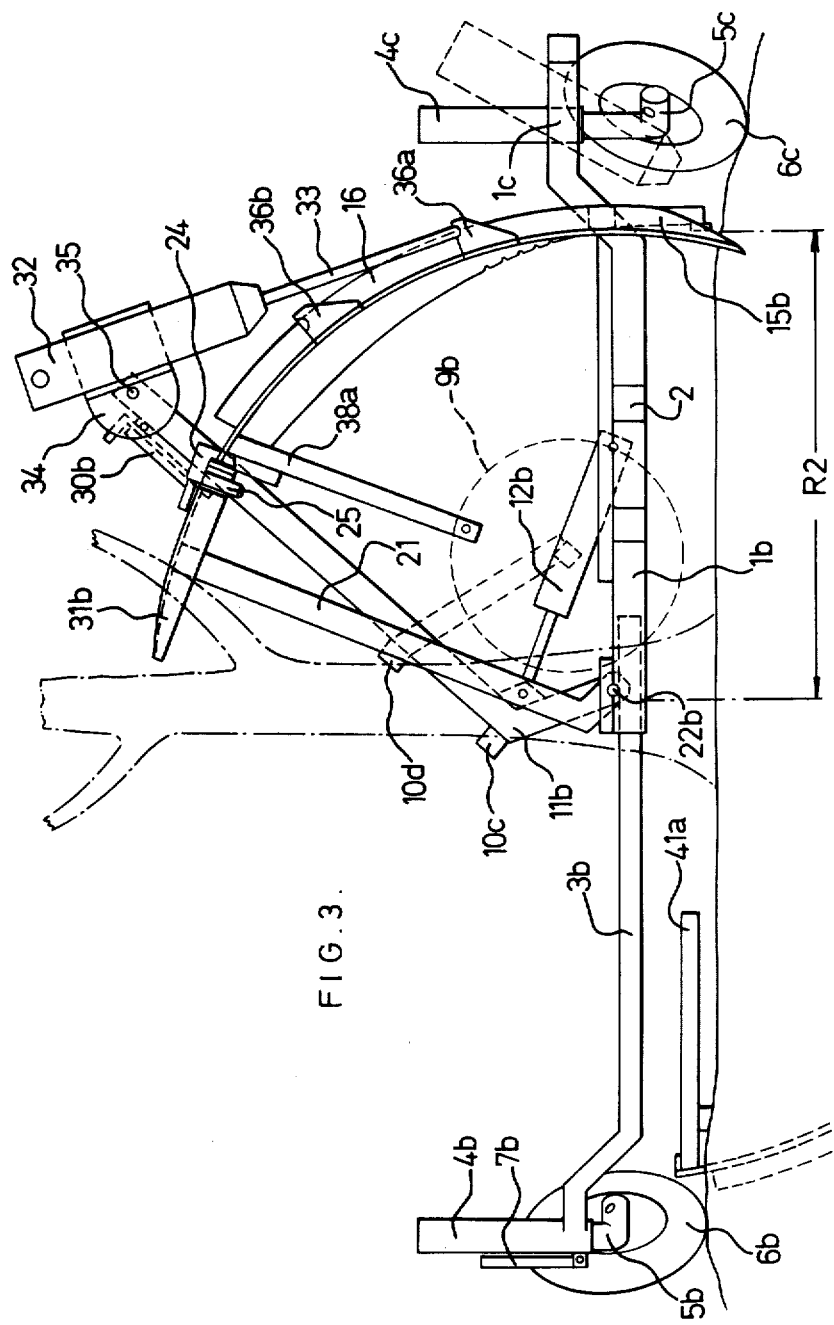

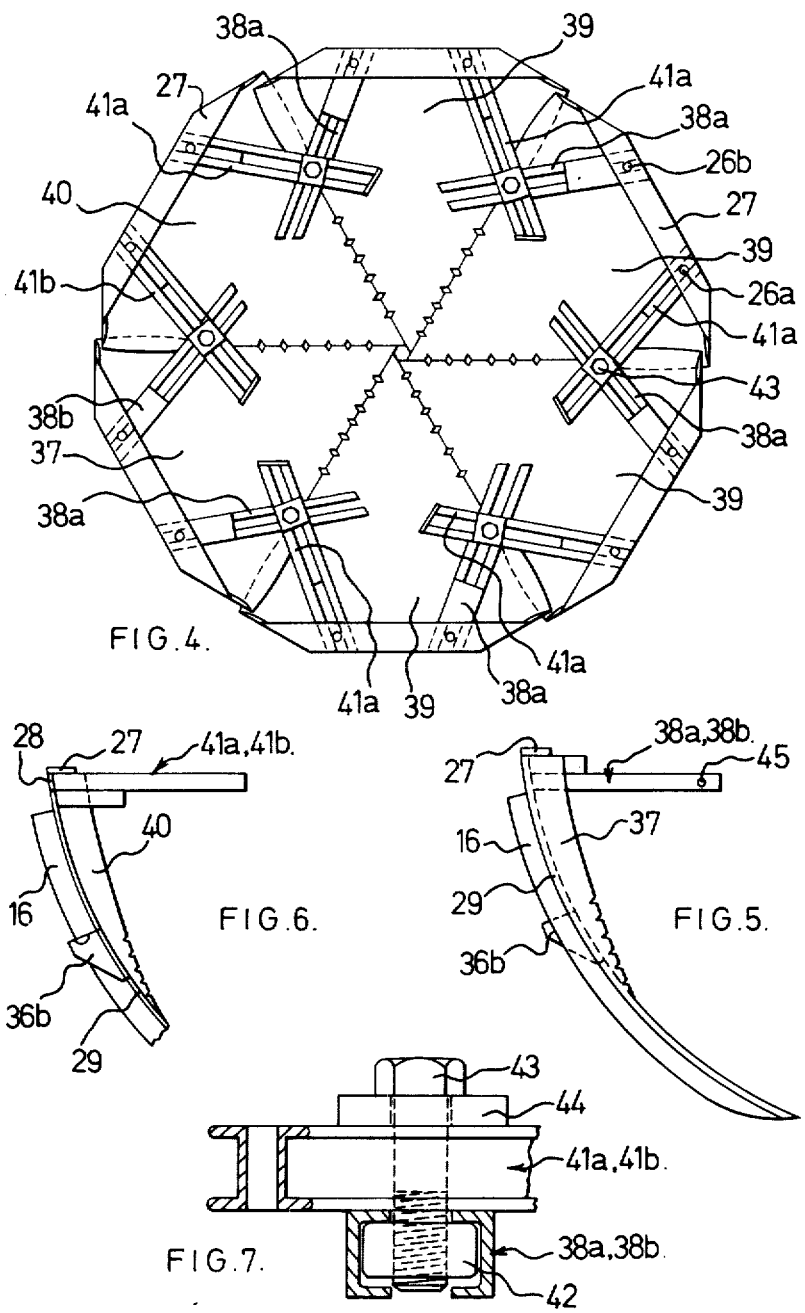

EXCAVATION AND TRANSPLANTING OF PLANTS WITH A BALL OF SOIL

TECHNICAL FIELD OF THE INVENTION

This invention relates to the mechanical transplanting of plants and trees, the healthy growth of which after transplanting requires that a substantial part of the root system be contained in a ball of soil retained undisturbed during transplanting. The hand digging of soil-balls, followed by wrapping and binding by hand has remained preferable to excavation by ordinary earth-moving equipment because of the need to cut roots cleanly and to avoid cracking the soil-ball. But over the past 20 years special digging and transplant equipment has been developed.

BACKGROUND OF THE INVENTION

British Standard 4043:1966 entitled "Recommendations for transplanting semi-mature trees", and Civic Trust (UK) publication "Practice notes on the transplanting of semi-mature trees" refer to the subject in recent years.

This inventor's British Pat. Nos. 992,491 and 1,094,890 introduced mechanical aids to wrapping and transplanting during 1962-1966. Other patents based on U.K. Patent No. 992,491 were U.S. Pat. No. 3,190,465; West German Pat. No. 1,175,933; French Pat. No. 1,325,813; Italian Pat. No. 665,173 and Canadian Pat. No. 693,367. U.S. Pat. No. 2,990,630 of 1961 referred to the design of a tree moving machine manufactured by Vermeer Mfg. Co. Pella, Iowa, USA, and later superseded by the range of Vermeer "Tree Spades" designated TS 30, TS 44, TS 66 for which there was no patent protection specified in the sales literature.

Within the past five years variants of the Tree Spade concept have been marketed from the USA by Spartan Landscaping, Lancing 48833, Mich., under the name "Big John" and in West Germany under the name "Optimal" by Opitz GmbH & Co KG, 8548 Heideck-/Seiboldsmühle. These variants of the "Tree Spade" concept differ mainly by the use of double curvature blades forced into the soil along a curved path in place of straight section blades. All such machines of the "Tree Spade" concept employ a multiplicity of blades, usually four, guided by a rigid frame having a hinged gate to permit the positioning of the apparatus about the tree. Each blade is forced into the ground by a hydraulic ram that reacts against the mass of the apparatus. The said mass coupled with the anchorage achieved by part driven blades limits the rate and extent of penetration by any one blade, until in the end position the driven blades substantially enclose a ball of soil containing part of the tree's roots. These previous designs are each mounted on a vehicle ranging from farm tractors up to eight wheel trucks for the larger versions transplanting a tree with soil-ball approximately 2 m diameter. The whole apparatus normally travels with one tree thus loaded for transplanting. The smaller versions may disgorge the soil-ball above ground level for wrapping by hand or with a pre-formed container to achieve greater economy of transport and output. Because of each machine's considerable mass and size when mounted on its integral vehicle it is unsuitable in practice for digging a soil ball substantially less than its designed maximum soil ball. This deficiency is reinforced by the economic constraints of growing trees in plantations and nurseries at the closest spacing compatible with available transplanting techniques.

SUMMARY OF THE INVENTION

According to the present invention there is supplied an apparatus for driving a multiplicity of curved blades around a plant and whereby the number of blades may be varied to excavate a range of sizes of soil-balls. Each blade is driven by the transfer of momentum from a rapidly reciprocating device such as a power hammer, (as might be used for breaking concrete), thereby imparting energy at a high rate without the need for the apparatus itself to be of large mass as is the case with previous designs using hydraulic ram pressure direct to each blade.

Furthermore, the present invention allows for sets of blades, when driven to their end positions to be locked together to form temporary and re-usable rigid containers separate from that part of the apparatus which guides and drives the blades. By this procedure the one apparatus for guidance and driving may consecutively excavate a number of trees of various selected soil-ball sizes. Such a group of trees may then be transported and transplanted as a single economic load.

By the present invention the extraction and transportation of the trees in bladed containers may be performed by any convenient conventional lifting means such as tractors with arms, or fork lift, or by a truck with a hoist. These vehicles are required only to lift a tree with its soil-ball surrounded by the rigid container of blades. It follows that the same size tree may be extracted by a lighter and more compact vehicle than is possible in combination with the previous heavy digging machines. Furthermore, it follows that trees may be grown closer than was practical previously, or that established plantation trees can be permitted to grow larger at their existing spacing.

In the present invention the apparatus for guidance and driving the blades is light enough to be manhandled into position under normal nursery conditions by two men, or to be towed longer distances by a small vehicle or tractor. In operation, the apparatus may be powered by a compact portable power unit, or it may draw on accessory power from a tractor.

This embodiment of the invention can be manhandled along nursery rows for the purpose of "root-pruning" as described in British Standard BS 4043:1966.

Another economic advantage of the present invention is that its small size permits the excavation of alternate trees as a natural silvicultural thinning process so that trees that would otherwise be felled young with negligable timber value may be replanted for amenity purposes. The light weight of the present invention suits it for being lifted over obstructions such as ditches and fences where conventional machines cannot reach. Where trees are to be transplanted to inaccessible town sites, blade-balled trees can be hoisted by crane beyond the reach of conventional tree transplanters.

One preferred embodiment of the invention will now be described by way of example with reference to the accompanying diagrammatic drawings.

BRIEF DESCRIPTION OF THE DRAWINGS

FIG. 3 is a sectional elevation of the apparatus as in FIG. 1, but in which the frame is extended for digging of a larger soil-ball than in FIG. 1.

FIG. 4 is a plan view of a complete set of driven blades with their spoke-like extensions locked to each other ready for lifting and transporting, but excluding the soil-ball for clarity.

FIGS. 5 and 6 are side elevational views respectively of a "first" blade and a "last" blade on which the aforesaid spokes are arranged to complete the cross-over pattern.

FIG. 7 is an elevational view of a preferred arrangement for locking together spokes of adjacent blades where these latter cross one over the other.

DESCRIPTION OF PREFERRED EMBODIMENTS

Figure 1:
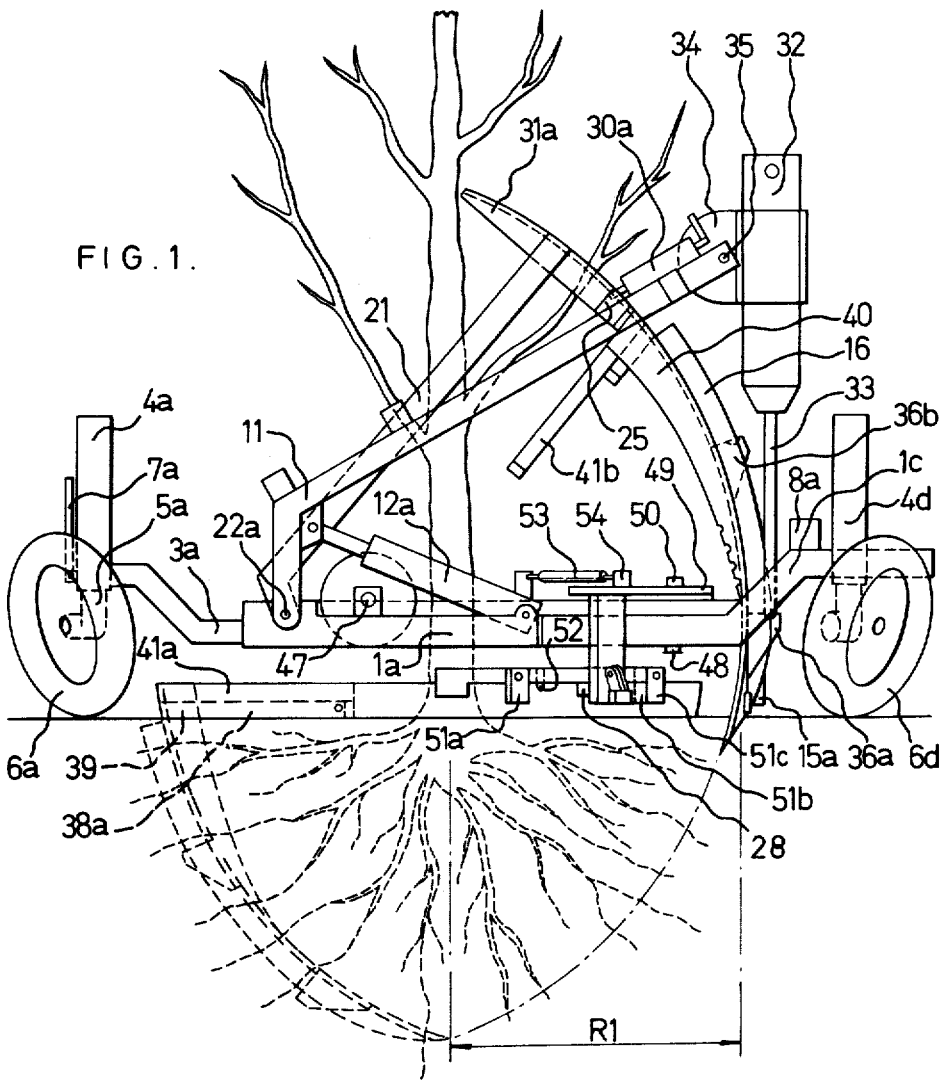
FIG. 1 is a side elevation of an embodiment of the invention with one blade in position prior to being driven down, and one of the previously driven blades which, together, substantially contain the ball of soil and root system to be transplanted shown in broken outline below ground.
Figure 2:
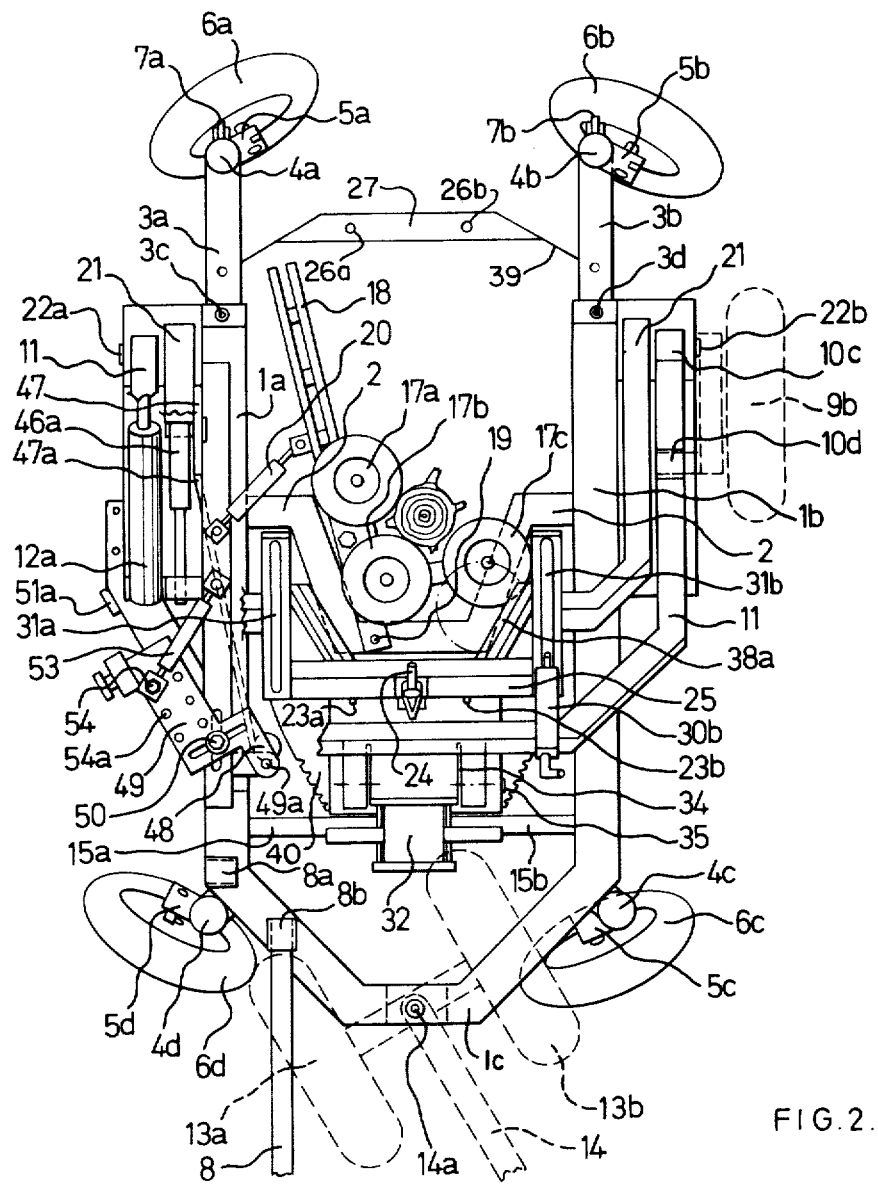
FIG. 2 is a plan view of the apparatus in the same configuration as in FIG. 1 which, for clarity, shows only one previously driven blade diametrically opposed to the blade about to be driven.

In the preferred version of the invention and referring to FIGS. 1, 2 and 3, the frame of the apparatus is a substantially horizontal hollow steel structure comprising two parallel members 1a and 1b linked by a U shaped member 1c and a cross member 2. Two extension beams, 3a and 3b, are slidable lengthways to suit the size of soil-ball to be excavated as indicated by the extended beam 3b in FIG. 3. The beams are locked by pins at 3c and 3d (FIG. 2).

At the outer ends of the two beams 3a and 3b are attached cylindrical support legs 4a and 4b inside which are rotatable stub legs 5a and 5b slidable vertically by fluid pressure actuated jacks (not drawn). Stub legs 5a and 5b are supported on wheels 6a and 6b angled from the vertical and with axles offset from the axis of leg rotation to produce a castor-like action. Similar legs 4c and 4d mounted on frame member 1c, contain similar stub legs 5c and 5d supported on wheels 6c and 6d having castor-like behaviour. For traversing the apparatus into position stub legs 5a and 5b are locked by hinged links 7a and 7b so as to position wheels 6a and 6b parallel to frame members 1a and 1b.

For positioning the apparatus around a tree, wheels 6a, 6b, 6c and 6d are free to rotate castor-like.

Directional control is aided by a detachable lever 8 inserted either in socket 8a or 8b mounted on frame member 1c. For transport over rough terrain or greater distances than between trees, supporting legs that carry wheels 9a (only one of which is shown in FIG. 2) slot into brackets 10c and 10d on hammer support arm 11 and may be lowered to operating level by action of pressure actuated cylinders 12a (only one of which is shown in FIGS. 1 and 2). Also for longer distance transport, bogey wheels 13a and 13b on tow-bar 14 may be attached by spherical ball pivot with pin lock 14a. Before driving the first blade 37, the transport wheels are removed and the apparatus is positioned with the trunk of the tree at a selected radial distance from the lower guidance struts 15a and 15b which carry bushed rollers bearing against the central spine 16 of the blade for blade guidance. This aforesaid radial distance R1 (FIG. 1) or R2 (FIG. 3) is predetermined to accommodate exactly the number of blades necessary to excavate an appropriate size of soil-ball. Means is provided for locating the apparatus for rotary movement around the tree at any selected radius and for the positioning of successive blades. A preferred feature of this means of guidance (FIG. 2) comprises two soft rubber wheels 17a and 17b on a common chassis slidable along a rail 18 and lockable at any chosen position. Rail 18 is hinged to move in a horizontal plane about pin 19 and is adjusted by turnbuckle 20. A third wheel 17c is carried by a link which is hinged about the axle of wheel 17b and is adjusted by strut and pin mechanism (not drawn). The illustrated embodiment comprises means for guiding each blade whilst being driven provided by U shaped guidance arm 21 (FIGS. 1 and 2) hinged at pins 22a and 22b on frame members 1a and 1b. At the other end of the guidance arm 21, attachment means 25 are provided for locating and locking the blade 37, 39 or 40 in the correct position during driving on a part circular path using two location pins 23a and 23b (FIG. 2) and a catch mechanism 24 on the cross beam 25 of the said guidance arm, to locate in location holes 26a and 26b in plate 27 at top of blade 37, 39 or 40 (FIG. 4) and lock in slot 28 (FIG. 6) at the top of the blade.

In this embodiment of the invention means of positioning the reciprocating hammer 32 is provided by the U shaped hammer-arm 11 which is hinged coaxially with the guidance arm 21 with pins 22a and 22b on frame members 1a and 1b. Two fluid pressure operated cylinder rams 12a and 12b mounted on frame members 1a and 1b rotate said hammer-arm 11 in an arc. This arcuate motion is also transmitted to the aforesaid guidance-arm 21 by two slidable bolts 30a and 30b (FIG. 1 and FIG. 3) on the outer part of the arm 11. Said bolts locate in slots 31a and 31b on the guidance-arm 21, permitting it limited movement relative to the hammer-arm 11 and vice-versa.

Figure 9:
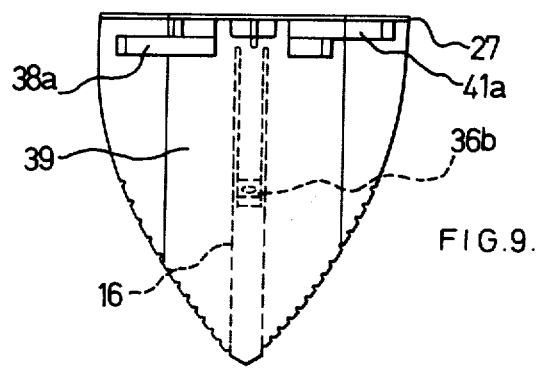
FIG. 9 is an end elevation of an "intermediate" blade showing the arrangement of two spokes used between "first" and "last" blades.

The hammer 32 and reciprocating bit 33, transmit the force to drive each blade through the soil and other obstructions such as roots and stones. Said hammer is mounted at the outer end of the hammer-arm on a cradle 34 pivotal on shaft 35 which permits rotation of the hammer towards the horizontal for convenience of loading and transporting. In order to drive blades, the hammer is locked by bolt mechanism in a position where the said bit 33 is parallel to the tangent to the arc of the blade with the point of bit 33 located in blade driving block 36a. Shorter blades that may be required to dig smaller trees may have only one such driving block per blade as shown at 36b (FIGS. 5, 6 and 9).

The operator controls said hammer by standing on the middle section of frame member 1c holding hand grips and trigger at the top of the hammer. Controls for supplying pressurized fluid to cylinders are mounted on a console (not drawn for reasons of clarity) above aforesaid leg 4d. Fluid pressure for the Apparatus may conveniently be supplied from any suitable external source or from a portable motor and pump unit adjacent to the apparatus, and connected to it by quick release couplings.

Normally the first blade 37 of a set, when driven to end position provides the initial location and reference for the subsequent location of the second blade 39. For commencing excavations in very hard ground it may be desirable to drive a pilot blade at the chosen radius prior to driving the first blade 37. Said pilot blade may be shorter and narrower than a normal blade 37, 39 or 40 to establish an accurate radius R1 or R2. The pilot blade has no spokes and is withdrawn before the end of the digging cycle to be replaced by the last blade of the set. The preferred embodiment of the invention incorporates blades part cylindrical in their middle section and part conical in their side edges about a common axis coinciding with the axis of the guidance arm 21 at pins 22a and 22b. Such blades when driven to end positions in a set may (FIG. 4) substantially meet at their lower ends. If a greater number of the same shaped blades be used to make up a set then the points of the blades will not meet (FIG. 8) but will still substantially contain a ball of soil such as a clay soil. The blades in this preferred version when driven form an overlap along the upper part of their sides. Thus there will be better containment of the soil and clean cutting of roots. To assist this cutting, the blades are toothed along part of their side edges.

In the preferred embodiment shown in FIG. 4 there are three types of blade in a set. The first blade 37 of the set to be driven, (immediately following the pilot blade if one is used), is of the same curved profile but with two spoke assemblies of type 38a and 38b (FIGS. 4 and 5) each resting on the soil at the end driven position. The second and subsequent intermediate blades 39 (FIGS. 4 and 9) and excepting the last blade, have one spoke of type 38a at soil level in end driven position and one spoke of type 41a which is raised above soil level in end driven position so as to cross over a spoke of type 38a of the previously driven blade.

The last blade 40 of a set (FIGS. 4 and 6) incorporates spokes of type 41b and 41a which complete the pattern of crossed spokes by passing over spoke type 38b on the first blade and spoke type 38a on the penultimate blade.

As shown in FIG. 7, means are provided for the locking together of crossed spokes of adjoining blade. The lower spoke 38a/38b retains a slidable square nut 42 into which is screwed a bolt 43 passing through a heavy washer 44 and between the two half members of the spoke type 41a/41b. The upper surfaces of spokes 38a and 38b and the lower surfaces of 41a and 41b may be roughened by a process such as knurling to increase the locking cohesion between crossed spokes.

As shown in FIG. 5, pin holes 45, are provided in spokes 38a and 38b for lifting. The use of said pin holes and lockable pins spreads the lifting loads substantially through all the spokes. When digging with sets of blades more numerous than drawn in FIG. 4, the lifting loads to the spokes may be transmitted by spreader beams (not drawn) to distribute loads substantially evenly between the spokes.

Means are also provided for mechanical rotation of the apparatus to successive positions for the driving of a set of blades. In this preferred version a fluid pressure cylinder (not shown) pulls a belt 46a about a stepped pulley 47 also carrying a cable 47a guided at pulley 48. Cable 47a with hooked end is engaged manually on the furthest vertical edge of the driven blade, such that operation of the cylinder ram 46 retracts the cable thus rotating the whole apparatus anti-clockwise through an arc equivalent to one blade width.

Thus, as shown in FIG. 1 and 2, there is provided an index-arm 49 pivoted at 49a and locked by slidable bolt 50 and with a cam operated clamp engaging hole 28 at the top of each successive blade. Lower edge of index-arm 49 carries stops 51a, 51b and 51c and locating pin 52 which together provide accurate location on the top of the blade previously driven. Index arm 49 is fixable about pin 49a by engaging screw-adjusting radius arm 53 by pin 54 in one of several jig-bored location holes in the index-arm, typified by hole 54a. According to which location hole pin 54 engages, the index-arm is located for the appropriate angle between adjacent blades to produce a full set of the desired number of driven blades. Means is provided for adjustable radius arm 53 to be set to nominal position or varied to compensate from time to time for small irregularities in the relative angular displacement of blades due to being driven through or deflected by obstructions.

Apparatus according to the invention may be provided with a tripod or polypod (not drawn) which is adjustable for length of leg. The base of each leg comprises a lug and pin means of locking to slot 28 in any blade. The apex of the polypod comprises two hinged and padded half circular members to fit around the trunk of the tree. Aforesaid polypod provides support for the heavy crowns of trees when laid over for transport.

Girdle strap 56 (FIG. 8) may be placed around the set of blades after extraction from the ground. The girdle strap of a strong non-extensible material and carries a number of slidable hooks typified by 57 by which it is attached at each driving block as at 36b, so that it can be tightened by a ratchet device 58 to thereby compress the bladed root-ball during travel. When a set of blades excavate a ball of soil and is open at its base, the girdle 56 may provide anchorage for extensible ties 59 radiating from a central ring 60 which will support a sheet of hessian or burlap type material (not drawn) to retain loose soil.

When digging a larger soil-ball than the available blades will contain, it may become necessary to drive a longer blade prior to the standard blades, so as to cut deep tap-roots under the tree. Such a root-cutting blade 61 (FIG. 8) is drawn in broken line, and is narrow and finely pointed. After driving it is immediately withdrawn by raising the hammer-arm linked to the guidance-arm by bolts 30a and 30b (FIG. 1).

Figure 8:
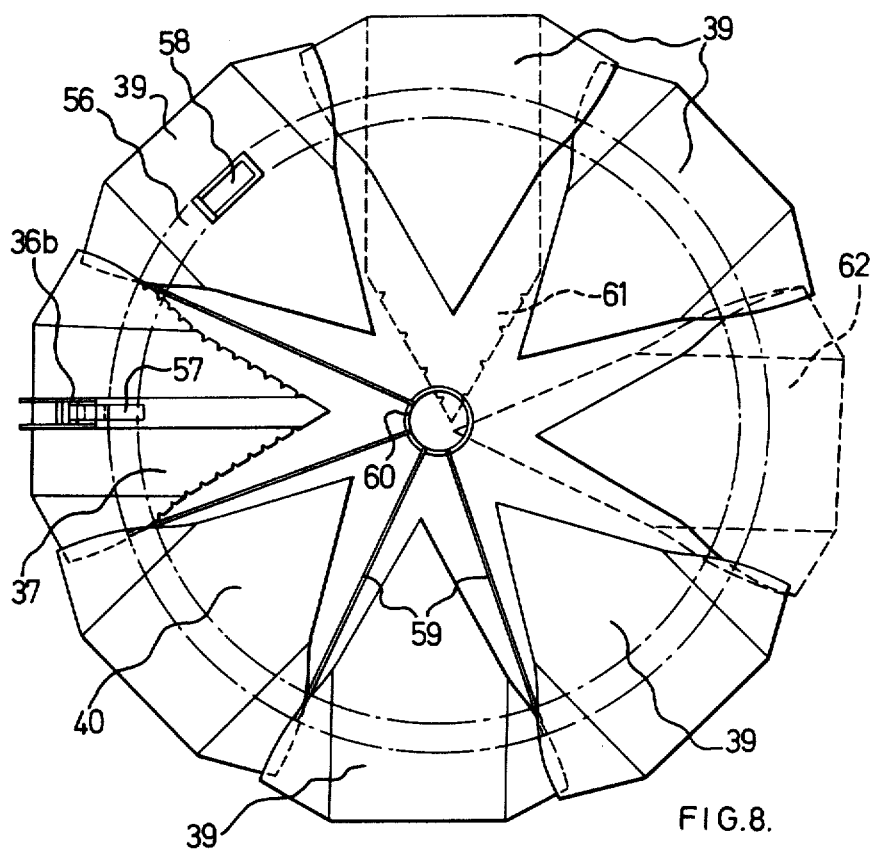
FIG. 8 is an inverted plan view of a set of blades of the same size as in FIG. 4, but incorporating a larger number of such blades so that their pointed ends no longer meet underneath the ball of soil, but nevertheless they form an adequately substantial container for transplanting certain soils such as clay.

Should it be wished to excavate a larger soil-ball as in FIG. 8 but completely contained within a set of blades this is achieved by employing a set of blades longer in arcuate length but of the same curvature and other features. One such longer blade is drawn for example in broken line at 62 (FIG. 8).

I claim:

1. Plant transplanting apparatus, for transplanting a plant together with a ball of soil containing roots of the plant, comprising:

a plurality of curved blades each having a wide end, a pointed end, and a curved longitudinal axis extending from the wide end to the pointed end such that the longitudinal axes of a plurality of said blades have the same radius of curvature;

hammering means for driving the blades into the soil one at a time, and which is detachably engageable with the blades;

guide means detachably connectable with the blades, for guiding the blades as the blades are driven into the soil along curved paths so that the wide ends of a plurality of blades which have been driven into the soil lie on a closed loop, without necessarily engaging each other, and the blades form, at least partially, a cup-shaped container in which the wide ends of the blades extend around said closed loop and the pointed ends converge at or adjacent each other;

at least two bars rigidly connected to the wide end of each blade and projecting from a side of the blade on which the center of curvature of the longitudinal blade axis is situated so that adjacent bars of blades which are successively driven into the soil are adapted to overlie each other in intersecting relation; and fastening means for securing the intersecting bars to each other to thereby hold the blades together after the blades have been detached from the hammering means and the guide means.

2. Apparatus, according claim 1 in which:

the guide means comprise a pivotally mounted guidance arm having a length equal to said radius of curvature, a pivotally mounted end, and a free end; and the wide end of each blade is detachably connectable to the free end of the guidance arm so that the longitudinal axis of the blade is centered on the pivotal axis through the pivotally mounted end of the guidance arm.

3. Apparatus, according to claim 1, for transplanting plants having trunks, characterized in that;

locating means are provided for locating the guide means relative to each trunk;

first adjusting means for adjusting the locating means are provided for cooperation with trunks of different sizes; and second adjusting means for varying the position of the locating means relative to the guide means so as to vary the size of the closed loop and the number of blades of which the wide ends form the closed loop.

4. Apparatus, according to claim 1, in which:

blade locating means are provided on the wide ends of the blades;

indexing means are provided for locating the guide means relative to a blade which has already been driven into the soil prior to driving a further blade into the soil and includes rotary locating means which are positively engageable with the blade locating means; and rotary adjusting means are provided for varying the orientation of the rotary locating means so as to provide accurate location of the guide means where different numbers of blades are employed and the closed loops provided by the wide ends of these blades are of different sizes.

5. Apparatus, according to claim 1, in which:

the guide means include a wheeled frame, cable winding means are mounted on the wheeled frame;

a cable has a first end attached to the cable winding means and a second end detachably connectable to a blade which has been driven into the soil so that, on operation of the cable winding means the wheeled frame is movable around the plant to be transplanted.

6. Apparatus, according to claim 5, in which:

the wheeled frame has four wheels and;

height adjusting means are provided for varying the height of the wheels relative to the wheeled frame so as to accommodate irregularities in the surface of the soil so that the wheeled frame can be aligned with a chosen reference plane.

* * * * *